June 11, 1935. E. J. KEARNEY ET AL 2,004,441
MILLING MACHINE ORGANIZATION
Original Filed May 11, 1925   9 Sheets-Sheet 2
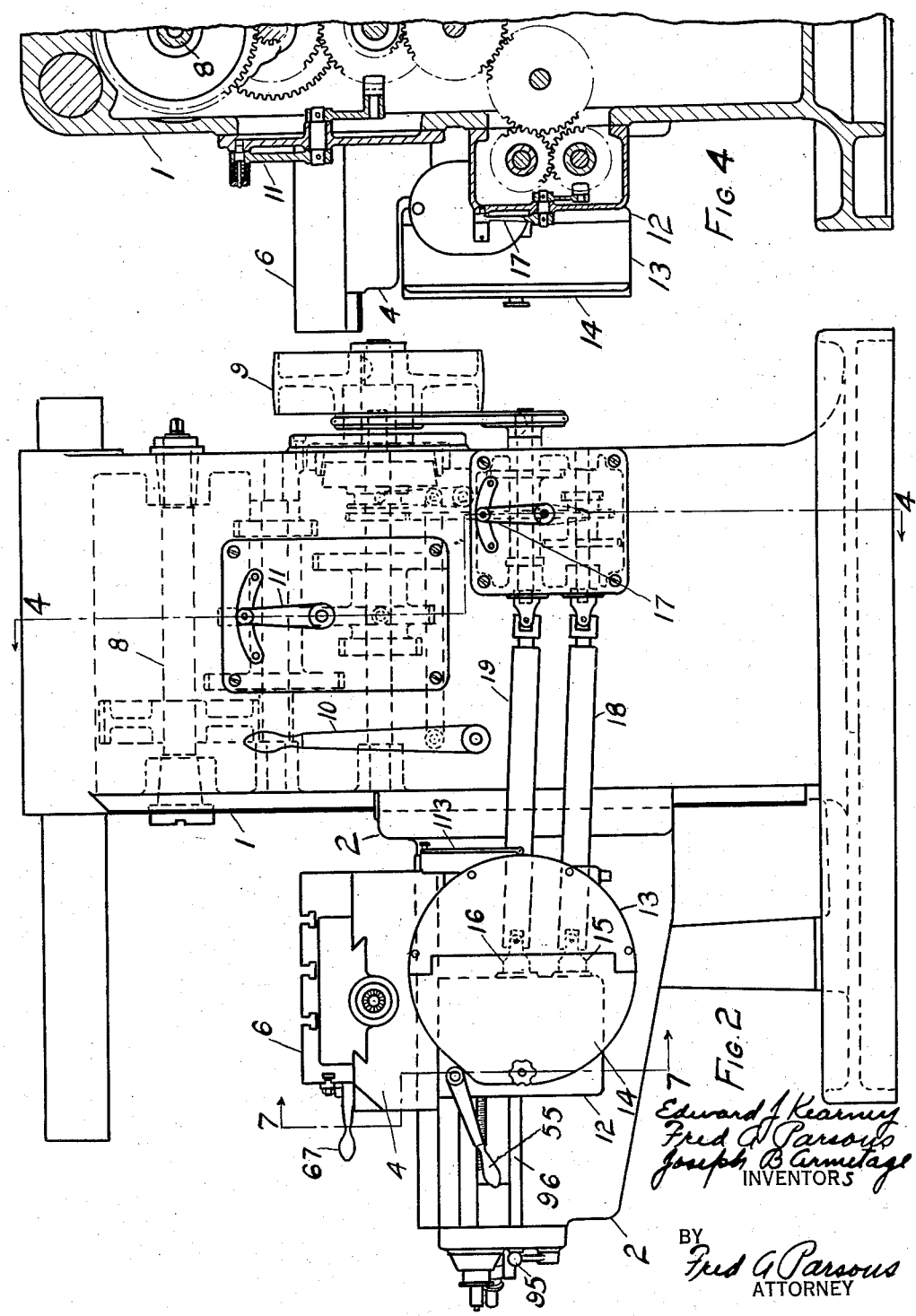

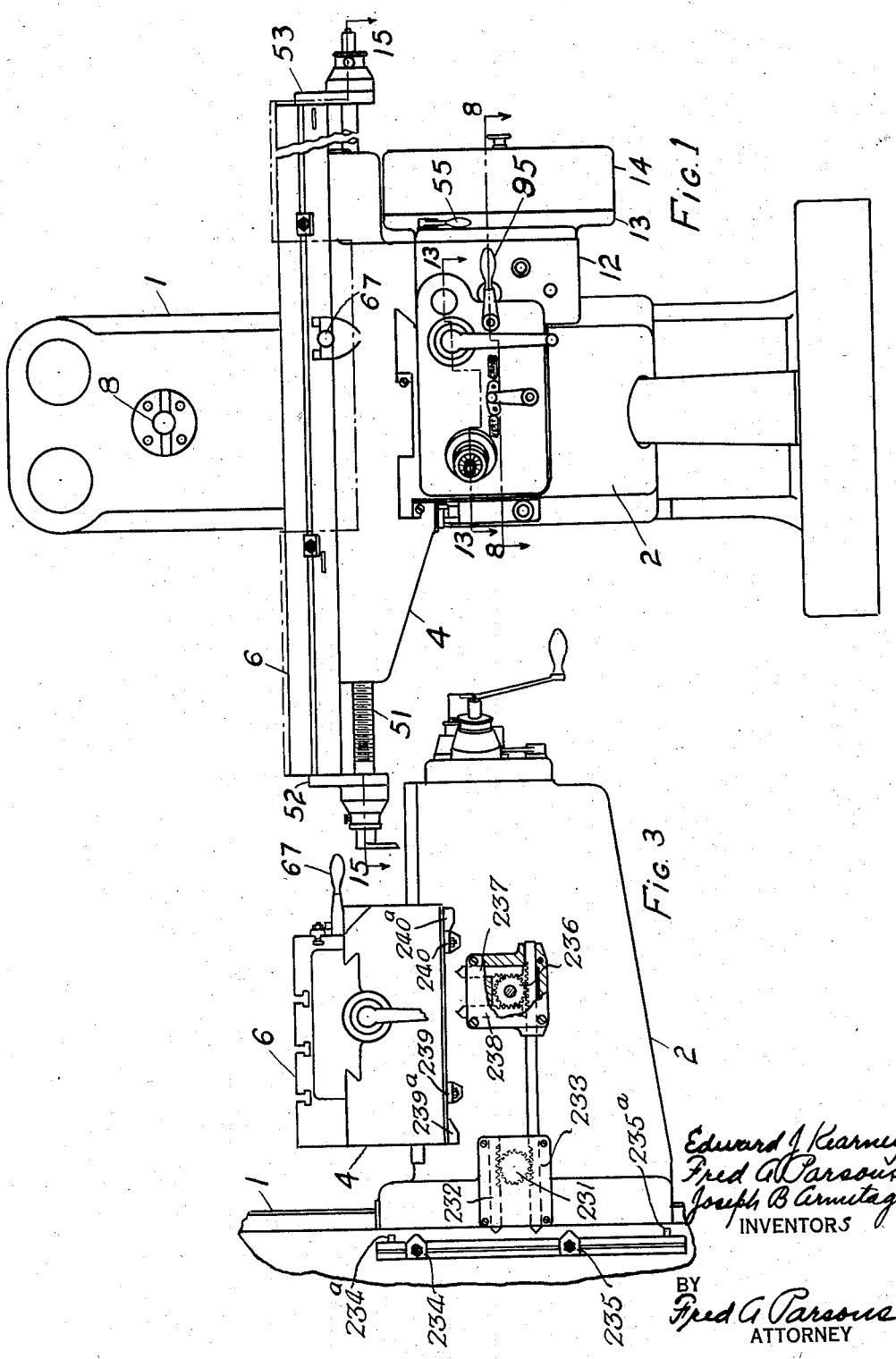

June 11, 1935.  E. J. KEARNEY ET AL  2,004,441
MILLING MACHINE ORGANIZATION
Original Filed May 11, 1925  9 Sheets-Sheet 3

Edward J. Kearney
Fred G. Parsons
Joseph B. Armitage
INVENTORS

BY
Fred G. Parsons
ATTORNEY

June 11, 1935.　　E. J. KEARNEY ET AL　　2,004,441
MILLING MACHINE ORGANIZATION
Original Filed May 11, 1925　　9 Sheets-Sheet 9
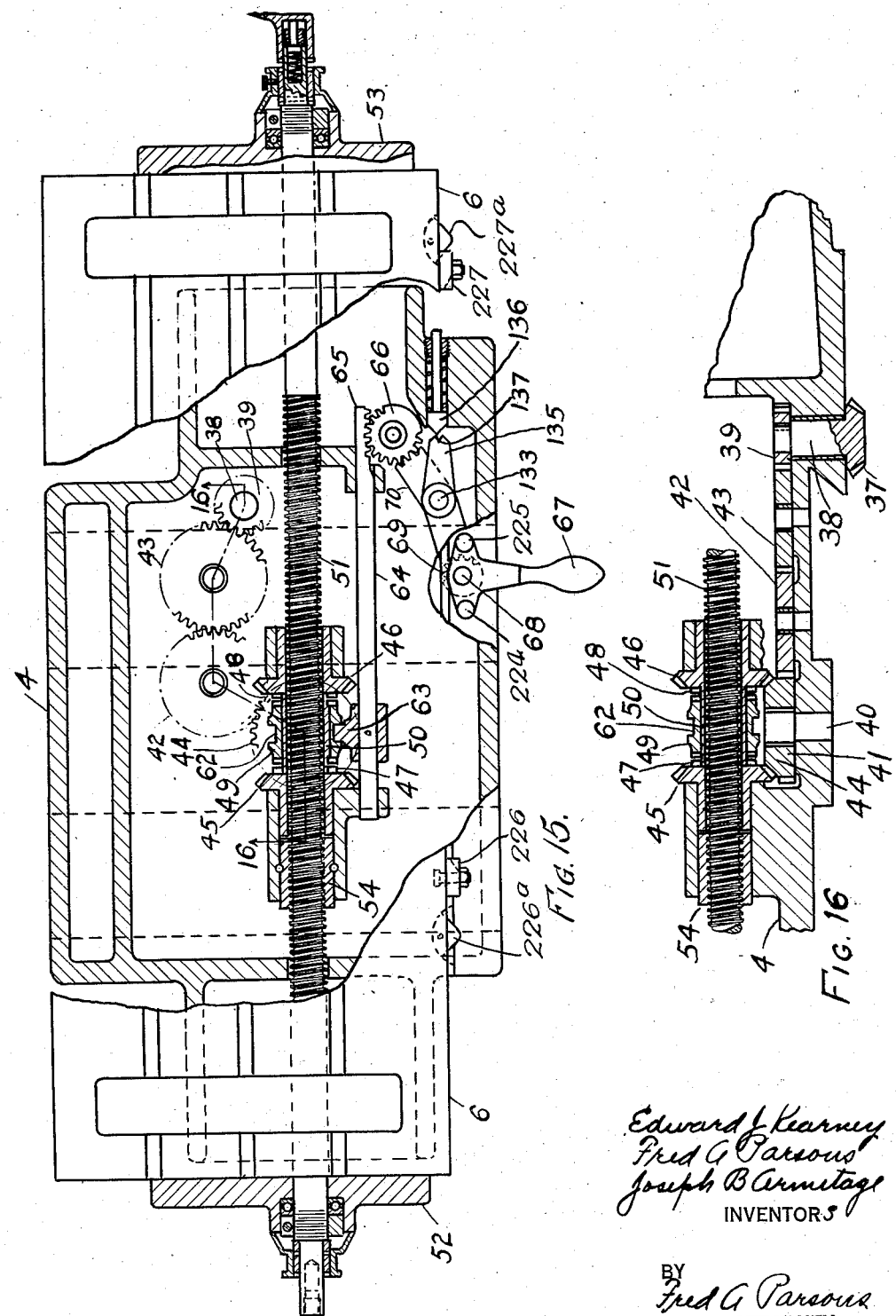
Edward J Kearney
Fred G Parsons
Joseph B Armitage
INVENTORS
BY
Fred G Parsons
ATTORNEY Patented June 11, 1935

2,004,441

UNITED STATES PATENT OFFICE 2,004,441

MILLING MACHINE ORGANIZATION

Edward J. Kearney, Wauwatosa, and Fred A. Parsons and Joseph B. Armitage, Milwaukee, Wis., assignors to Kearney & Trecker Corporation, West Allis, Wis.

Application May 11, 1925, Serial No. 29,433
Renewed April 18, 1932

42 Claims. (Cl. 90—21)

This invention relates to improvements in a milling machine organization, and more particularly to the transmission and control means whereby the relative movements of the work and tool are accomplished.

A main purpose of this invention is to provide mechanism whereby both hand and automatic control may be accomplished for relative work and tool movement in a plurality of paths.

An important object is to provide in a milling machine having relative work and tool movement in a plurality of paths, an improved transmission and automatic control mechanism whereby the several movements in the several paths may be caused to proceed in cycles either independently or simultaneously, or in part independently and in part simultaneously, and whereby the individual movements or cycle portions of each path may be accurately timed in relation to the cycle portions of other paths.

A further purpose is to provide transmission and control means whereby member or support movements in various paths as noted above may be driven and controlled in such a manner that the cycles of any individual member or of the same member in different paths, forming portions of a main or combined cycle may be independent in extent or duration, so that the various movements be started, stopped or reversed independently.

Another purpose is to provide automatic mechanism, which permits certain functions to be independent for the different supports, as previously explained, yet creates certain dependency for other functions. In a milling machine organization, if the tool is in contact with the work piece, all or any movements should take place at a feed or cutting rate, while if the tool is not cutting, all movement should be at a rapid or quick traverse rate, in order that the idle or non-productive movements should be quickly completed. This invention therefore contemplates transmission and control mechanism which may control the various movements independently so far as above described, while insuring that any or all movements actually in use shall be at like rates, namely, either feed or quick traverse.

Other objects are to provide automatic means which while permitting all the movements to take place simultaneously at a power rapid traverse rate, permits the rapid traverse rate to be proportioned to the operative conditions inherent to separate or individual movements, so that for instance, the table may move longitudinally at a comparatively fast quick traverse rate but when moved in the vertical direction when it is necessary to raise and lower heavy parts having comparatively great inertia, or when moved in the cross direction where comparatively short movements are required, may operate at a reduced or comparatively slow quick traverse rate, while still permitting simultaneous feed movements at substantially the same rate for each of the movements.

Other purposes relate to provision of automatic transmission and control mechanism as above set forth, while still maintaining a hand or non-automatic control substantially the same as that ordinarily employed for the hand control of the operative or power mechanism of completely non-automatic machines, and readily permitting complete hand or complete automatic control or desirable combinations of both, this being of advantage where the machine is to be worked by operators familiar only with non-automatic control methods and being of further advantage inasmuch as not all work is suited in quantity or form for completely automatic machine operation.

Another purpose is to provide automatic control mechanism having a portion completely individual to a certain more important or most used movement, while having other portions which may be alternatively available for the control of either of a plurality of other movements.

Other purposes relate to simplification and improvement in the construction, organization and operation of the transmission and control mechanism of milling machines.

Our invention therefore consists in the construction, arrangement and combinations of parts as hereinafter particularly shown, described and pointed out in the accompanying drawings, specifications and claims and in various modifications and equivalent embodiments thereof, it being understood that the invention may be embodied in a variety of forms.

In the accompanying drawings, like reference characters denote like parts throughout the several views in which:

Figure 1 is a front elevation or view from the operator's position of a milling machine embodying our invention,—the machine here shown being of the general type commonly known as a knee and column type horizontal milling machine.

Figure 2 is a side elevation of the same machine viewed from the right of Figure 1.

Figure 3 is an elevation of the vertically movable portion of the machine shown at the front of Figure 2, the view being taken from the left of Figure 1.

Figure 4 is a partial vertical section along the line 4—4 of Figure 2.

Figure 15 is a plan view, partially in section and enlarged, of the table and saddle and portions of the driving mechanism, along line 15—15 of Figure 1.

Figure 16 is a vertical section along the line 16—16 of Figure 15.

Figure 5:
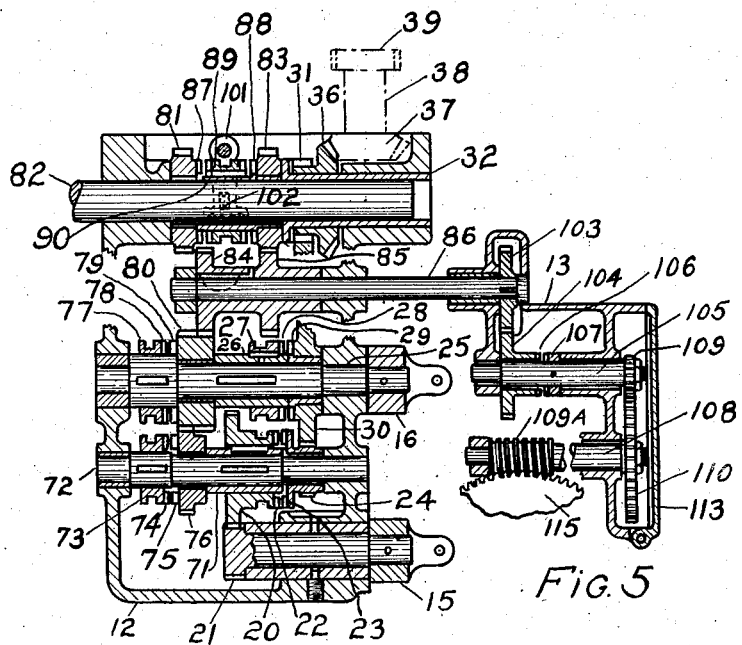
Figure 5 is a developed section, enlarged, through the box or housing shown in Figures 1 and 2 attached to the saddle for cross movement therewith.

The milling machine embodies a column 1 supporting a knee 2 vertically slidable on suitable ways on the column. Slidable toward and from the column on the knee 2 is a saddle 4, suitable slideways being provided for this purpose; and slidable on the saddle 4 is a table 6 likewise provided with suitable sliding surfaces or ways, the various slidable members or supports combining to form a support for the table 6 from the column or stationary support member 1 to give to the table movement in three transverse directions obtained through the relative movement of the several supporting members. The table movement in the saddle is termed the longitudinal movement; the saddle movement on the knee is termed the cross movement; and the knee movement on the column is termed the vertical movement.

Rotatably mounted in the column 1 is a spindle 3 and supported from the column is a rotatable driving pulley 9 forming a power source for driving the various mechanism embodied in the machine. Intermediate between the spindle 3 and the driving pulley 9 is a suitable transmission mechanism for obtaining a variety of spindle speeds, and a clutch controlled by hand lever 10, similar in the present embodiment to mechanism which has been previously described and shown in Patent No. 1,749,225, March 4, 1930. Choice of the various speeds is controlled by a lever 11, as described in the patent referred to.

On the saddle 4 and fixed for movement therewith, is a housing or box member 12, and attached thereto is a case or housing 13, and a swinging cover 14, the several members 12, 13 and 14 providing a support and housing for various transmission and control mechanism to be later described. The housing 12 rotatably supports a feed member or element 15, and a power rapid traverse member or element 16.

The feed element 15 may be rotatably driven from the pulley 9 at a plurality of feed rates determined by the operator through the manual movement of a feed change lever 17, the power being transmitted from transmission elements supported on the stationary column to the member 15 relatively movable with the saddle through the intermediate agency of a universal joint shaft 18, which provides for maintaining an operative connection in spite of the movement of the saddle, all in a manner and by the means of transmission and feed change mechanism similar to that previously disclosed in the above named application for the driving of a similar feed member.

A constant power rapid traverse movement is transmitted from the pulley 9 to the power rapid traverse element 16, power being transmitted from transmission elements in the column to the member 16 through the intermediate agency of a universal joint shaft 19, which provides for relative saddle movement, and through other transmission members from the pulley 9, all in a manner and by means of transmission mechanism similar to that disclosed in the above named preceding application for the driving of a similar rapid traverse member.

The transmission mechanism for driving the spindle 8, the feed element 15, and the rapid traverse element 16 being similar to the mechanism employed and described for similar purposes in the above named preceding patent, a description of such mechanism will not be repeated here.

A variety of transmission trains originate in the box or housing 12 for the driving and controlling of the table, the saddle and the knee, and for the movement of an automatic control drum.

The transmission mechanism whereby the table 6 may be actuated either from the feed element 15 or power rapid traverse element 16 will now be described:

From the feed element 15, (see Fig. 5) power is transmitted to a gear 20 through a pinion 21, the extended stem of which is journaled in the box or housing 12 and has the member 15 fixed upon its opposite end. The gear 20 is provided with an extended hub having clutch teeth 22 adapted to engage, when the gear 20 is shifted in the proper direction, with clutch teeth 23 fixed with a pinion 24, the pinion 21 being made of sufficient width to permit the shifting of the gear 20, while still maintaining operative engagement. The quick traverse element 16 is fixed with a shaft 25 journaled in the box 12, and keyed for rotation with shaft 25 is a sleeve 26. Upon the sleeve 26 is slidably keyed a clutch member 27, having clutch teeth 28 adapted, when the element 27 is shifted in the proper direction, to engage with clutch teeth 29 on a gear 30. The pinion 24 and the gear 30 mesh together, and the gear 30 meshes with a gear 31 rotatably mounted on a sleeve 32 fixed in the housing 12.

It will be apparent that when the gear 20 is connected, as above described, to drive the pinion 24, the gear 31 will be driven at a feed rate, while when the member 27 is connected, as above described, to drive the gear 30, the gear 31 will be driven at a constant or rapid traverse rate; and furthermore, that for any given rotative speed of the respective members 15 and 16, the ratio or comparative rates of feed or quick traverse motion transmitted to the gear 31 will depend in part upon the ratio of the gears 24 and 30, and in part upon the rate of actuation of the elements 15 and 16.

Figure 12:
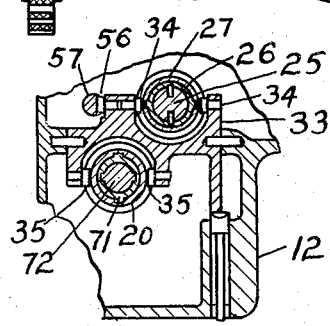
Figure 12 is a fragmentary section along the line 12—12 of Figure 8.

The gear 20 and the clutch member 27 are interconnected for simultaneous movement by the means of a lever 33 (see Figure 12), the opposite ends of which carry pivoted shoes 34 and 35, engaging annular grooves in the respective members, the arrangement being such that when the gear 20 is moved in the one direction and the clutch teeth 22 and 23 thereby engaged to drive the gear 30 at a feed rate, the clutch member 27 will be moved out of engagement and vice versa.

The gear 31 is fixed with a bevel gear 36, which is permanently meshed with a mating bevel gear 37 fixed on the lower end of a stem 38, upon the opposite end of which is mounted a spur gear 39, the stem 38 being rotatably mounted in the saddle 4 (see Fig. 16). Rotatably mounted on a stud 40 in the saddle 4 is a spur gear 41 arranged to be driven from the gear 39 through the intermediate gears 42 and 43; and fixed with the gear 41 is a bevel gear 44 permanently meshed with a pair of oppositely disposed bevel gears 45 and 46 journaled for rotation in the saddle 4. The bevel gears 45 and 46 are respectively provided with clutch teeth 47 and 48, and a clutch member 49 is slidably keyed between the bevel gears on a sleeve or collar 50, which in turn is slidably keyed with and supported from the lead screw or table screw 51, which is fixed for rotation in brackets 52 and 53 attached to the table 6.

Fixed in the saddle 4 is a nut 54 engaging the screw 51. It will be apparent that the bevel gears 45 and 46 will be oppositely driven whenever the gear 30 is actuated. The clutch member 49 is provided with clutch teeth complementary to the teeth 47 and 48, and adapted for engagement therewith whenever the clutch member is shifted in one or the other direction; and when so shifted to engage the complementary clutch teeth, the screw 51 will be caused to rotate in the one or the other direction, and caused to advance axially in the one or the other direction relative to saddle 4, owing to the engagement of the screw with the nut 54. The screw being fixed against axial movement in its bearings in the table brackets, the table will be forced to follow the axial movements of the screw.

It will therefore be apparent that either a feed or rapid traverse rate may be transmitted to actuate the table, and in either direction from the respective feed and quick traverse elements 15 and 16.

Figure 6:
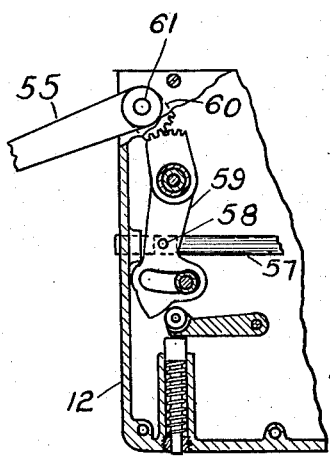
Figure 6 is a section along line 6—6 of Figure 7.
Figure 9:
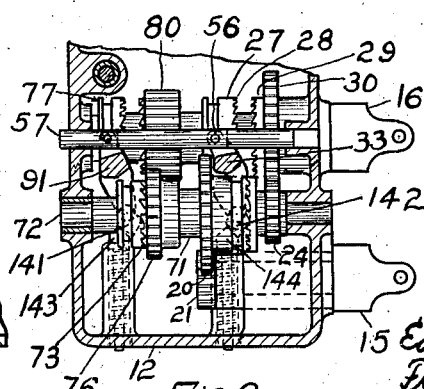
Figure 9 is a vertical section along line 9—9 of Figure 7.

The means by which the feed or quick traverse movements of the table may be hand controlled for rate and direction will now be described:

As previously noted, the clutch member 27 and the gear 20 may be simultaneously shifted by the means of the interconnecting lever 33. The lever 33 may be shifted from a hand lever 55 as follows:

The lever 33 (see Figs. 6, 9 and 12) is provided with a pivoted shoe 56 engaging with a slot in a rod 57 which is connected to be operated from the hand lever 55 by the means of a shoe 58 pivoted in the one end of a pivoted intermediate lever 59, having at its opposite end toothed engagement with a segment 60 upon the shank 61 of which the hand lever 55 is mounted. The shifting of the hand lever in the one or the other direction will therefore engage either the clutch teeth 22 with the clutch teeth 23, or the clutch teeth 28 with the clutch teeth 29, thereby transmitting either a feed or a rapid traverse movement to the table train.

The table reverse clutch member 49 is provided (see Fig. 15) with an annular groove 62 engaged by a fork or shifting member 63 fixed for movement with a rod 64 provided at the one end with rack teeth 65 engaging pivoted segment 66. A hand lever 67 is pivoted in the saddle 4 on a stem or shank 68, upon the lower end of which is fixed a segment 69. Arranged to transmit motion between the segment 69 and the segment 66 is a pivoted lever 70 having at its opposite ends teeth adapted to engage the respective segments.

It is therefore apparent that the reverse clutch member 49 may be shifted in the one direction or the other through the operation of the lever 67 and through the medium of the motion transmitting elements just described, thereby causing engagement with the one or the other of the oppositely driven bevel gears 45 or 46, and accordingly as engaged with the one or the other, opposite motion would be transmitted to the table from the gear 30.

The means whereby feed or power rapid traverse movement is transmitted to the knee 2 and to the saddle 4 will now be described:

The feed gear 20 previously described is slidably keyed (see Fig. 5) with a sleeve 71, which in turn is keyed for rotation with a shaft 72 journaled in the box or housing 12 and supporting a clutch member 73 slidably keyed therewith. Clutch member 73 is provided with clutch teeth 74, which, when the clutch member is suitably moved, will engage complementary clutch teeth 75 fixed on a gear 76 whereby the gear 76 will be driven from the feed member 15 and if so driven the gear 76 will drive a gear 80 meshed therewith, as will be later further described, at a feed rate.

Slidably keyed on the previously described shaft 25, is a clutch member or element 77 provided with clutch teeth 78 so disposed that when the member 77 is suitably moved, they will engage and drive complementary clutch teeth 79 fixed on the gear 80, whereby the gear 80 will be driven from the quick traverse member 16. The gear 80 meshes with a gear 81 rotatably supported from a shaft 82 having suitable bearings in the housing 12. A gear 83 is similarly mounted for rotation on shaft 82 and is connected to be driven from the gear 80 in a direction opposite to the gear 81 through the idler gear 84 meshing with the gear 80 and the idler 85 fixed for rotation with gear 84 and meshing with the gear 83, the gears being fixed for rotation with the shaft 86 journaled in the housing 12. The gear 81 is provided with clutch teeth 87, and the gear 83 is provided with clutch teeth 88. A clutch member 89 between the two gears is slidably keyed with a sleeve 90, which in turn is slidably keyed with the shaft 82. The member 89 may be shifted in the one or the other direction for alternative engagement with the clutch teeth 87 and 88, whereby the shaft 82 may be driven in the one or the other direction, the drive being either at a feed or rapid traverse rate according to the engagement of the clutch members 73 or 77 and the relative rate of the feed and rapid traverse being determined in part by the ratio of the gears 76 and 80 and in part by the speed of the driving elements 15 and 16.

From the shaft 82 mechanism is provided for alternatively actuating either the saddle in its cross movement or the knee in its vertical movement and for the manual choice of which shall be actuated at any given time. Fixed on the front end of shaft 82 is a gear 200, see Fig. 13, meshing with a gear 201 rotatable on a sleeve 202 fixed with knee 2. Gear 201 drives an angular gear 203, rotatable on a sleeve 204, through an idler gear 205.

Journaled in an axial bore in the sleeve 202 is a rotatable lead screw 206, prevented from axial movement relative to knee 2 in the usual manner, and in threaded engagement with a nut 207 fixed with saddle 4. The gear 201 is provided with clutch teeth 201a, and a clutch member 208, slidably keyed on lead screw 206 is provided with complementary clutch teeth adapted to engage therewith when the clutch member is shifted in the proper direction in which case the screw will be driven to move the saddle from shaft 82, or to disengage when shifted in the other direction.

Figure 14:
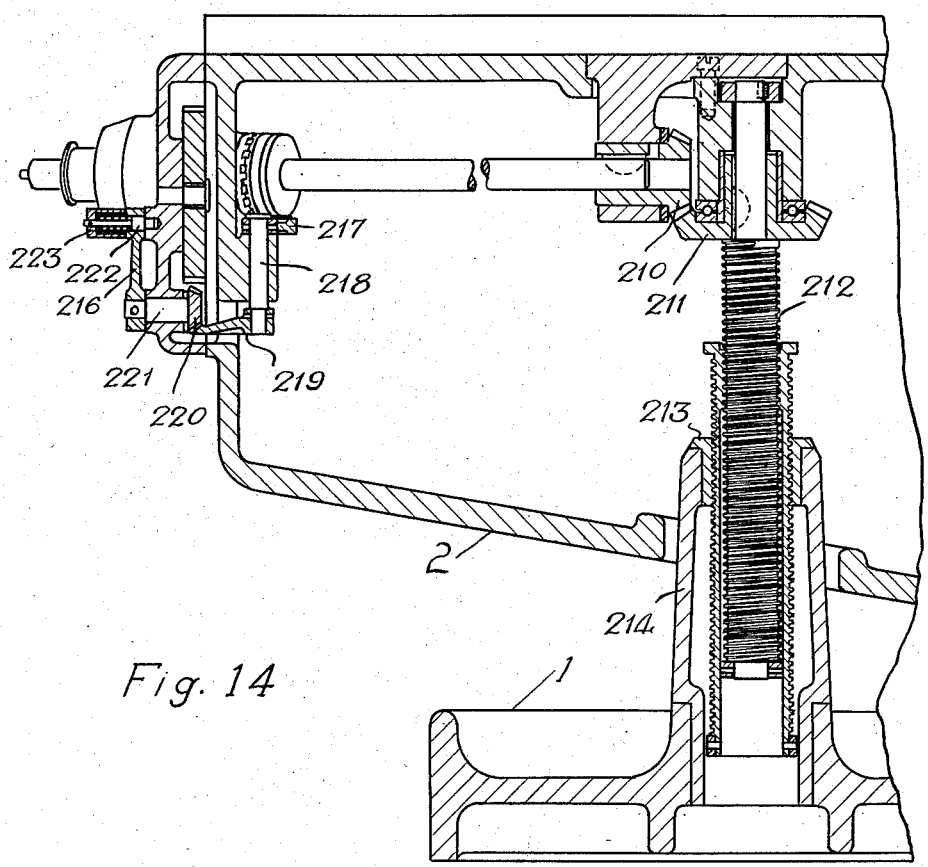
Figure 14 is a partial vertical section along the line 14—14 of Figure 13, showing some of the mechanism of the knee.

A shaft 209 is journaled in an axial bore of the sleeve 204, and a gear 210 is fixed for rotation with the shaft, gear 210 meshes with a gear 211, see Fig. 14, which is fixed on a screw 212 which is the inner member of a telescopic screw of usual construction, having a nut 213 fixed in an extension 214 of the base of column 1. Gear 203 is provided with clutch teeth 203a, and a clutch member 215, slidably keyed on shaft 209 has complementary clutch teeth adapted to engage therewith when the clutch member is shifted in the one direction in which case the screw will be driven to move knee 2 from shaft 82, or to disengage when shifted in the other direction.

It will be noted from preceding description that the relative rate of the table feed and rapid traverse is determined in part by the ratio of the gears 24 and 30, while the relative rate for the saddle and knee is determined in part from the ratio of the gears 76 and 80. Different relative rates may therefore be had for the table and for the saddle and knee. According to other gearing in the train, the table might be given any rate of feed and by suitable gears 24 and 30 any relative rapid traverse rate, and likewise with the drive for the other supports. It is preferred, however, that the feed rate for the several supports should be made the same and that the rapid traverse of the table should be relatively more rapid than for the other supports.

Figure 7:
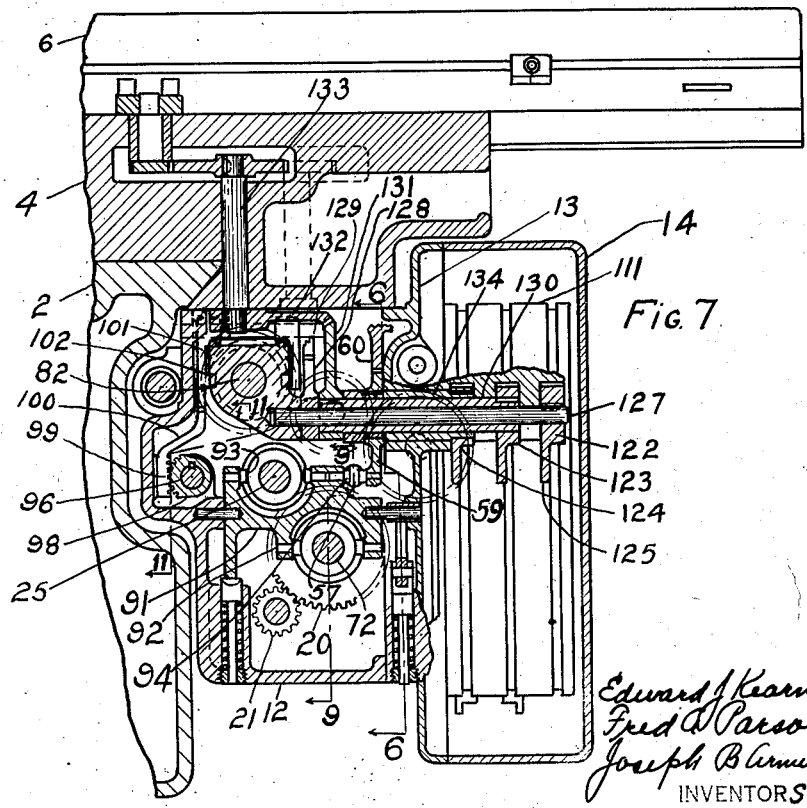
Figure 7 is an enlarged vertical section along line 7—7 of Figure 2.

The several clutches by which the knee and saddle movements are accomplished, may be hand controlled by the following mechanism:

The clutch members 73 and 77 (see Figs. 7 and 9) are interconnected for simultaneous movement by the means of a pivoted lever 91, the lever 91 having pivoted shoes 92 and 93 having engagement in the annular grooves of the respective clutch members. The lever 91 is likewise provided with a pivoted shoe 94 engaging a suitable groove or slot in the rod 57 which, as previously described, is movable from the hand lever 55. The hand lever 55 may thus move the lever 91 in the one or the other direction to determine the engagement of the respective clutch members 73 and 77, the arrangement being such that when the one is engaged the other is disengaged, thereby determining whether the shaft 82 shall be driven at a feed or rapid traverse rate.

For the movement of the reverse clutch member 89, a hand lever 95 (see Fig. 8) is fixed on the end of a shaft or rod 96 journaled at the rear end in a projecting lug 97, and at the front end in a plate on the knee 2. The shaft 96 is slidably splined in the hub of a bevel segment 98 axially aligned with the shaft and journaled in the box or housing 12 with which it moves, the splined relationship between the segment 98 and the shaft 96 thus permitting movement of the segment from the hand lever 95 in whatever relative position the saddle may stand on the knee 2.

The segment 98 meshes with bevel gear teeth on the one arm of a lever 99 (see Figure 8) pivoted in the box 12 and provided with another arm 100 (see Figure 7), which has suitable gear teeth meshing with an extended arm of a pivoted fork 101, the fork being provided with pivoted shoes 102 engaging an annular groove in the clutch member 89.

Through the motion transmitting mechanism above described, the hand lever 95 when moved in opposite directions, may actuate the clutch member 89 into the one or the other of its positions of engagement and thus cause the shaft 82 to be driven in the one or the other directions.

The power trains by which shaft 82 may actuate the saddle and knee have been previously described and the effect thereof is manually controlled by a hand lever 216, see Figs. 13 and 14, which is connected with the clutch members 208 and 215 as follows. A lever 217 is fixed on a short shaft 218, pivoted in the knee. Lever 217 has oppositely extended arms respectively engaging suitable annular grooves in the respective clutch members. Fixed on the lower end of shaft 218 is a segment 219 engaging a segment 220 fixed upon or integral with a short shaft 221 upon the outer end of which the lever 216 is fixed. When lever 216 is swung in the one direction, one of the clutch members 208 or 215 will engage to be driven from shaft 82, and when swung in the other direction, the other clutch member will engage. A spring plunger 222 serves to locate lever 216 in the different positions, the end of the plunger being engageable with suitable holes or notches in the knee, from which it may be withdrawn to move to a different position, by the means of a hand grip 223, which also serves to move the lever when the plunger is withdrawn.

It will thus be apparent that the movement of the shaft 82 may be hand controlled to give either a feed or quick traverse and in either direction to the knee or saddle as may be desired.

In addition to the hand control above described, the power movement of the table may be interrupted by the means of dogs on the table having connection at intervals of table movement and through suitable trip means and connecting elements with the reverse clutch element 49, whereby the clutch element will be moved from either position of engagement to a central or non-driving position as follows:

Lever 67, see Figs. 1 and 15, is provided with upstanding trip pins or lugs 224 and 225 arranged to stand at equal distance from the front edge of table 6 when the clutch member 49 is in central position. When the lever is moved to engage clutch member 49 in either direction, one of the pins is moved in toward the table edge, and into the path of movement of one or the other of dogs 226 or 227, which are adjustably fixed on the front edge of the table by the means of T bolts and a T slot in the usual manner. The dogs are provided with angular faces adapted to contact the pins during the course of table movement and move the pin back to a position corresponding to the central or disengaged clutch position, thus stopping the movement of the table.

Positive trip dogs 226a and 227a are permanently fixed on table 4 in a position to contact with one of the trip pins before table 6 reaches the limit of its travel in either direction, thereby disengaging the power table movement before damage can result in case the operator fails to suitably position the dogs 226 or 227.

Figure 8:
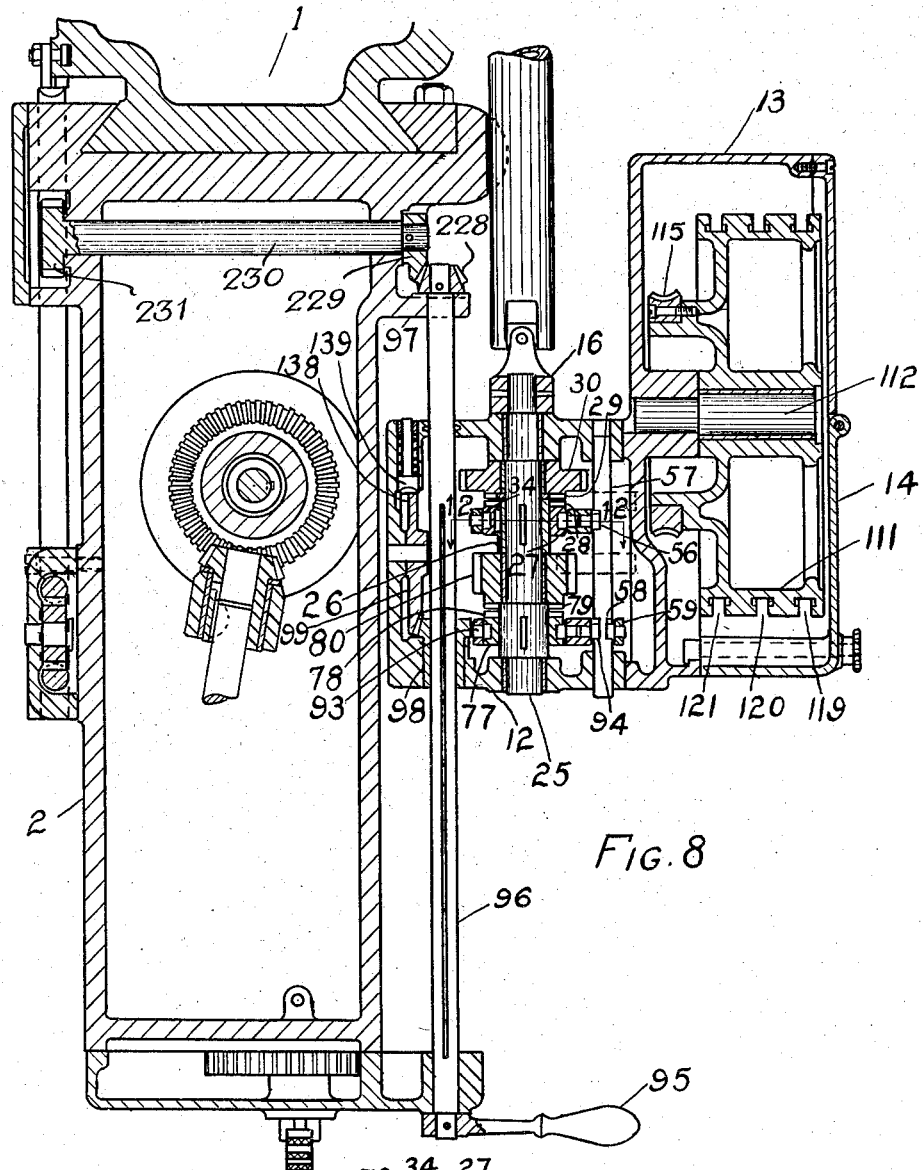
Figure 8 is an enlarged horizontal section along line 8—8 of Figure 1.

Also the cross or saddle movement and the vertical or knee movement may be interrupted by the means of dogs respectively on the saddle and on the column having connection at intervals of the movement of the respective supports with the reverse clutch element 89, whereby the clutch element will be moved from either position as follows:

The shaft 96, see Fig. 8, which controls clutch member 89, as previously described, is extended and carries a bevel gear 228 fixed thereon, which meshes with a bevel segment 229 fixed on a shaft 230, upon which is fixed a spur gear 231. Spur gear 231 meshes with suitable rack teeth in trip pins or plungers 232, 233, see Fig. 3, disposed on opposite sides of the gear periphery, and with angular end portions projecting rearwardly to be contacted by suitable dogs 234 or 235 adjustably fixed on column 1 by the means of a T slot and T bolts in the usual manner. When shaft 96 is moved in either direction to engage clutch member 89, thereby starting the movement of knee 2 if the clutch member 215 is engaged, the one or the other of pins 232, 233 is moved for its angular end portion to stand in the path of relative resulting movement of one or the other of dogs 234 or 235, if the dogs are suitably positioned in their adjustment. The angular face of the dog will then contact with the angular end portion during knee movement and force the contacted pin back to a position corresponding to a disengaged clutch position, thereby moving clutch member 89 back to a central, disengaged position and stopping the movement of the knee.

Positive trip dogs 234a and 235a are permanently fixed on the column in a position to contact with one of the trip pins before knee 2 reaches the limit of its travel in either direction, thereby disengaging the power knee movement before damage can result in case that the operator fails to suitably position the dogs 234 or 235.

The pin or plunger 233 is extended to engage by the means of suitable rack teeth, see Fig. 3, with a pinion 236, which also engages with suitable rack teeth on trip pins or plunger 237 and 238. The movement of clutch member 89 in either direction of engagement, which starts movement of saddle 4 if clutch 208 is engaged, will, by the above described mechanism move the angular or beveled end of one or the other of pins 237 or 238, upward into the path of movement of one or the other of dogs 239 or 240, which are adjustably fixed on the saddle by the means of a T slot and T bolts in the usual manner. In the course of the resulting saddle movement one or the other of the dogs will, if suitably adjusted, contact with such pin and force it back again, thereby moving clutch member 89 back to a central or disengaged position and stopping the movement of the saddle.

Positive trip dogs 239a and 240a are permanently fixed on the saddle 4 in a position to contact with one of the trip pins before saddle 4 reaches the limit of its travel in either direction, thereby disengaging the power saddle movement before damage can result in case the operator fails to suitably position the dogs 239 or 240.

Figure 18:
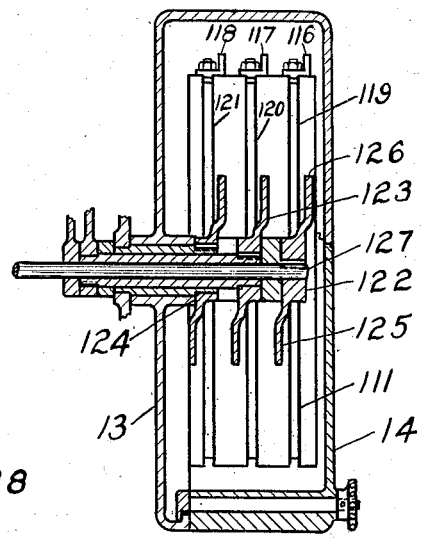
Figure 18 is a vertical section along the line 18—18 of Figure 11.
Figure 17:
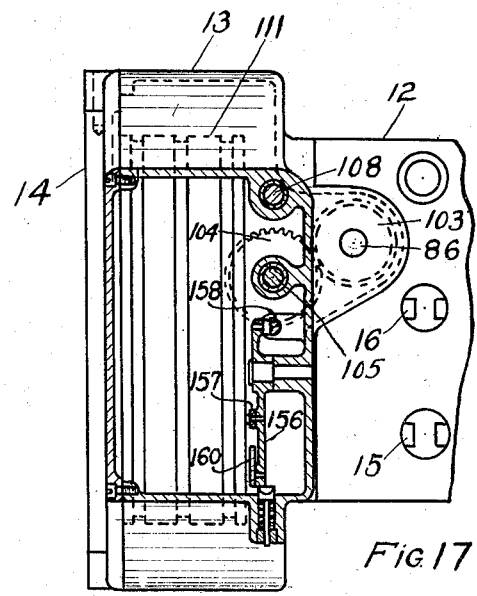
Figure 17 is a vertical section along the line 17—17 of Figure 11.

The mechanism by the means of which the various movements may be automatically controlled will now be described:

A drum or carrier or control member 111 (see Fig. 18, etc.), provided with a plurality of removable and adjustable dogs 116, 117 and 118, and power driven in rotary cycles, is provided with trip means to connect between the respective dogs and the several transmission clutches at intervals during each cycle or rotation of the carrier, as will be later described.

For driving the carrier 111, the shaft 86 is extended rearwardly as particularly shown in Figure 5, and projects into the box or housing 13 which, as previously noted, is fixed with the box 12. It is there provided with a gear 103 fixed on the end of the shaft and meshing with a gear 104 rotatably mounted on a shaft 105 journaled in the housing 13. The gear 104 is shiftable endwise, and provided with clutch teeth 106 which, when the gear is suitably shifted, may engage and actuate complementary clutch teeth on a clutch member 107 fixed with the shaft 105. When the complementary clutch teeth are engaged, the shaft 105 will be driven from the shaft 86.

Figure 11:
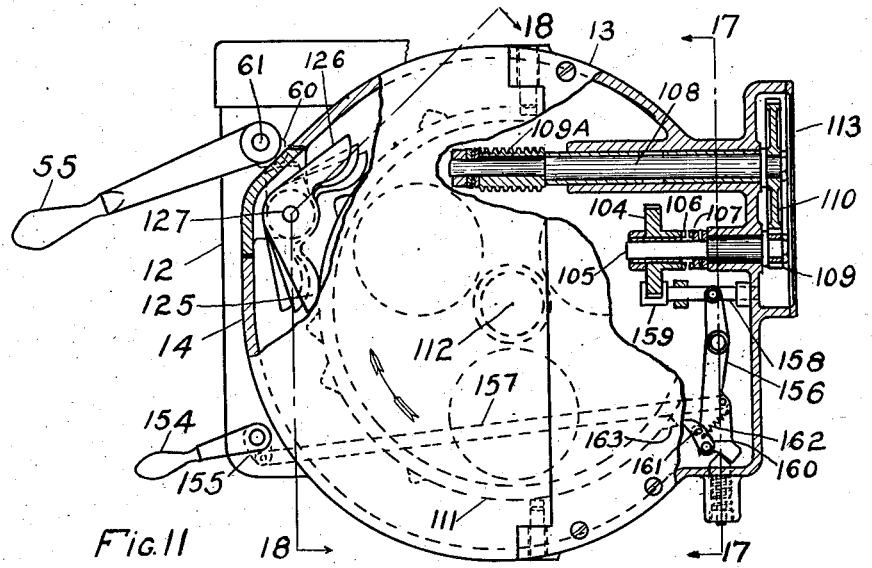
Figure 11 is a partial view from the right of Figure 1, enlarged, and partially in section showing the box or housing previously mentioned as fixed with the saddle.

Another shaft 108 (see Figs. 5 and 11) is journaled in the box 13, and the ends of the shafts 105 and 108 are prepared for receiving intermeshing pick-off or change gears 109 and 110, which are provided in sets, to give any desired ratio of speeds between the two shafts, and which may be interchangeable or reversible in their position on the shafts. Fixed on the shaft 108 is a worm 109a permanently meshed with a worm wheel 115 fixed on the hub of the carrier or control member 111 rotatably mounted in the box 13 on a stud 112 fixed in the box. A pivoted cover 113 provides, when opened, access to the change gears 109 and 110, while a previously mentioned pivoted cover 14 provides access to the periphery of the drum or control member 111 for the adjustment or removal of the various dogs.

From the mechanism just described, it will now be apparent that the carrier or control member 111 will be actuated whenever either or any of the supports of the machine are actuated, and will be driven at a feed rate or at a power rapid traverse rate accordingly as the actuated support or supports are so driven, although the arrangement is such that the carrier, when operated at a rapid traverse rate, will partake of the relatively slow rapid traverse rate utilized for saddle and knee movement. The member 111, however, is not reversible, and although one or several of the supports may be reversed or actuated in reciprocatory or cyclic movements, the carrier or control member 111 will continue to move in the same direction so long as the clutch teeth 106 are in a driving position, repeating rotary cycles which normally may be considered to consist of one revolution of the carrier. The rate of carrier movement or duration of a carrier cycle or revolution may be altered by the means of the pick-off or change gears 109 and 110, whereby its cycle time duration may equal or exceed the combined cycle duration of the several supports or members controlled thereby, irrespective of variations in the distance traversed by the controlled supports.

The dogs 116, 117 and 118 (see Figs. 11, 18, etc.) are adjustably fixed for rotation with the drum or control element 111 by the means of bolts engaging the respective slots 119, 120 and 121 (see Figure 8), and suitably positioned and pivoted in the housing or case 13 are the trip elements 122, 123 and 124. Each of the trip elements are provided with oppositely extended arms or cam surfaces which are shown for the element 122 as 125 and 126, the respective arms being offset so that they may be contacted by differently shaped dogs. The arm 125, for instance, may be contacted by a dog in the slot 119 similar to the dog 116, but having an upwardly projecting portion at the left instead of at the right, while the arm 126 may be contacted by a dog fixed in the slot 119 having an upwardly projecting portion at the right as shown for dog 116. If the one arm is contacted by a suitable dog, the member 122 will be swung in the one direction; while if the other arm is so contacted, the member 122 will be swung in the opposite direction.

It will thus be apparent that by the use of suitable dogs retained in suitable slots, any one of the trip elements 122, 123 or 124 may be actuated in either direction at any time during the carrier cycle from dogs adjustably mounted for rotation with the carrier 111.

The respective trip members 122, 123 and 124 are connected for movement of the respective clutch members or elements determining or controlling the various support movements, as will now be described:

The clutch element or member 122 (see Fig. 7) may, when actuated as above described, move the reverse clutch lever or fork 101 through the medium of an extended shaft 127 suitably journaled in the housing 12 and 13; on the one end of which the member 122 is fixed and having at the opposite end a segment 128 meshing with suitable gear teeth on an extended arm 129 of the fork 101. It will thus be apparent that the reverse clutch member 89 may be actuated in either direction from the movement of the carrier and at intervals determined by the rate of carrier rotation and by the positioning of the adjustable dogs 116, or similar dogs as above described. By the means of transmission mechanism previously described, the control thus applied to the clutch element 122 may be rendered effective either on the knee or the saddle, to determine if and when they shall be actuated and in which direction.

The member 123 may actuate the table reverse clutch 49, the member being fixed on the one end of a sleeve 130 suitably journaled in the box 13 and having fixed at the other end a bevel segment 131 meshing with a bevel segment 132 fixed on the lower end of the stem or shaft 133, at the upper end of which is fixed the segment 70 which has previously described motion transmitting connection with the fork 63 for the movement of the clutch 49. It will thus be apparent that suitable dogs 117, or similar dogs mounted on the carrier 111 may actuate the clutch 49 in either direction at intervals determined by the rate of carrier movement and the positioning of the dogs, and may thus determine if and when and in what direction the table may be actuated.

The member 124 may simultaneously actuate the several feed and rapid traverse clutches previously described, the member being mounted at the one end of a sleeve 134 journaled in the housing or box 13 upon the other end of which is previously fixed the lever 59 having previously described motion transmitting connection with each of the several feed and rapid traverse clutches. It may therefore be seen that the several feed clutches may be simultaneously engaged when the member 124 is actuated in the one direction or the several quick traverse clutches may be simultaneously engaged when the member 124 is actuated in the opposite direction, the member being actuated in either direction by the means of dogs 118 or similar dogs adjustably mounted on the carrier 111, the position and form of the dogs 118 and the rate of carrier movement thus determining if and when the rate of the driving transmission or trains for the several supports shall be changed from a feed to a quick traverse rate or vice-versa.

It is apparent that if desired the clutches may be power actuated from a position of the one engagement to a central position in which they are not engaged, this being accomplished merely by making the proper dogs of less height. Each of the reverse clutch members 89 and 49 are provided with means for restraining the respective clutch members in a central or non-operative position. For the clutch member 49 this is accomplished by providing the segment 70 (see Fig. 15) with a cam or detent 135 which is acted upon by a spring pressed plunger or arrow 136 and which has, when in the position corresponding to the central or non-operative position of the clutch, a notch 137 into which the plunger 136 may enter, thereby restraining the movement of the segment and through the connecting elements also restraining the movement of the clutch 49.

Should the detent 135 be shifted through the actuation from any of the control means previously described from its position where the central notch is engaged by the plunger, the formation of the cam surface and the relationship of the various parts is such that the plunger having passed over the point of the cam in the one or the other direction tends to force the clutch quickly into the one or the other position of engagement.

Figure 10:
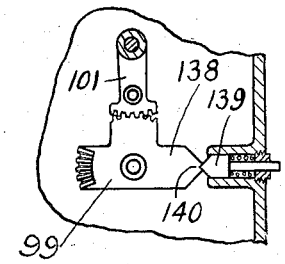
Figure 10 is a diagrammatic drawing for the purpose of explaining the relations and connection of certain of the control elements as will be later described.

A similar means is provided for retaining the clutch member 89 in a central or non-operative position, and for quickly throwing it in one of the other direction of engagement by the means of a similar cam 138 (see Figs. 8 and 10) on an extended arm of the pivoted segment 99, the plunger 139, and the central notch 140, the cam controlling the movement of the clutch through the motion transmitting connections from the segment 99 previously described.

The levers 33 and 91 controlling the movement of the various feed and quick traverse clutches are respectively provided with the cams or detents 141 and 142 (see Fig. 9), which are respectively acted upon by the spring-pressed plungers 143 and 144. The cams 141 and 142 have no central notch and therefore when either cam has passed over the position corresponding to the central or neutral position of the clutches controlled thereby, the plunger will immediately operate to cause opposite engagement of the clutches.

As previously described, the levers 33 and 91 are interconnected for simultaneous movement by the means of the rod 57, the clutches 77 and 27 both moving in the one direction at the same time that the clutches 73 and 20 move in the opposite direction. This requires that at each movement of the rod 57 in either direction, two clutches will be caused to engage. Clutch elements, when engaging, sometimes come in such positions of the mating teeth, that there is a slight delay or interval before the opposed teeth have revolved to relative positions to permit engagement, and to avoid such delay in the one clutch from affecting the other, and to facilitate the engagement, means are provided whereby each clutch may engage in a semi-independent manner. Lost motion is provided between the rod 57 and the shoe 56 and 94, the lost motion being sufficient that, when the rod 56 is moved in either direction, either by the movement of the carrier dog 118 or the hand lever 55, the clutch may be thrown quickly into engagement after the arrow 141 or 142, as the case may be, has passed its center.

The lost motion likewise serves other purposes. When changing from a feed to a power rapid traverse or vice-versa, it is important that before the dis-engagement of the one set of clutches is effected, the detents or arrows should be positioned to effect the re-engagement of the other set, for the reason that both sets of clutches may not both be engaged at one time without damage and it is therefore necessary that one set be completely dis-engaged before the other starts to engage. The lost motion mentioned above renders it certain that, no matter in which direction the engagement takes place, the point of the arrow will always have travelled past the point of the cam or detent before the clutches dis-engage, and is then in a position as soon as dis-engagement of the out-moving clutches takes place, to rapidly move the in-moving clutches into full engagement and thus continue the movement of the driven members.

This rapid in-movement, independent of the rate of movement of the actuator, is likewise highly desirable to prevent the clutches from being held in a position of partial engagement by the slow movement of an inexperienced operator when moving the clutches by the means of the hand lever 55, and for other reasons.

Since the machine is provided with control means independently of the carrier and it is purposed to operate the machine at times without the use of the automatic control features provided by the carrier, and for other reasons, means are provided whereby the carrier may be disconnected from its driving train and remain stationary as long as may be desired, or may be again re-engaged immediately to continue the automatic control from the carrier.

A pivoted hand lever 154 (see Fig. 11) carries an arm 155 which is connected to move the pivoted lever 156, by the means of the rod 157. The lever 156 is connected at the one end with a rod 158 having a forked end 159 engaging the sides of the gear 104. As previously noted, the gear 104 may be shifted and thereby engage or dis-engage the clutch 106, through which the carrier drive is transmitted. It will thus be apparent that the carrier drive may be interrupted or re-established by the means of the hand lever 154.

Carrier movement may likewise be interrupted by the movement of the carrier. The lever 156 carries at the one end a pivoted latch 160, normally held in position against a stop pin 161 by the means of a spring 162. When in this position and with the lever 156 in the position corresponding to the engaged position of the clutch 106, the latch 160 will eventually be contacted by a removable dog 163 on the periphery of carrier 111. The relative form and dimensions of the parts are such that when so contacted as the dog 163 continues its movement, the latch 160 will be first moved away from the position in which it is normally held by spring 162 and arrive at a second position where no farther movement can take place without swinging the entire lever 156, which movement continues until the clutch 106 dis-engages and the carrier movement stops. It may be immediately re-established by the movement of the hand lever 154. To do this it is necessary to continue the movement of the lever 156 until the point of the latch 160 clears the dog 163, where the spring 162 will immediately pull the latch back to its original position against the stop pin 161, in which position it will now clear the dog 163. The movement of the hand lever 154 is then reversed and the clutch 106 thereby re-engaged. If it is desired to permit continuous movement of the carrier, the dog 163 is removed.

Figure 13:
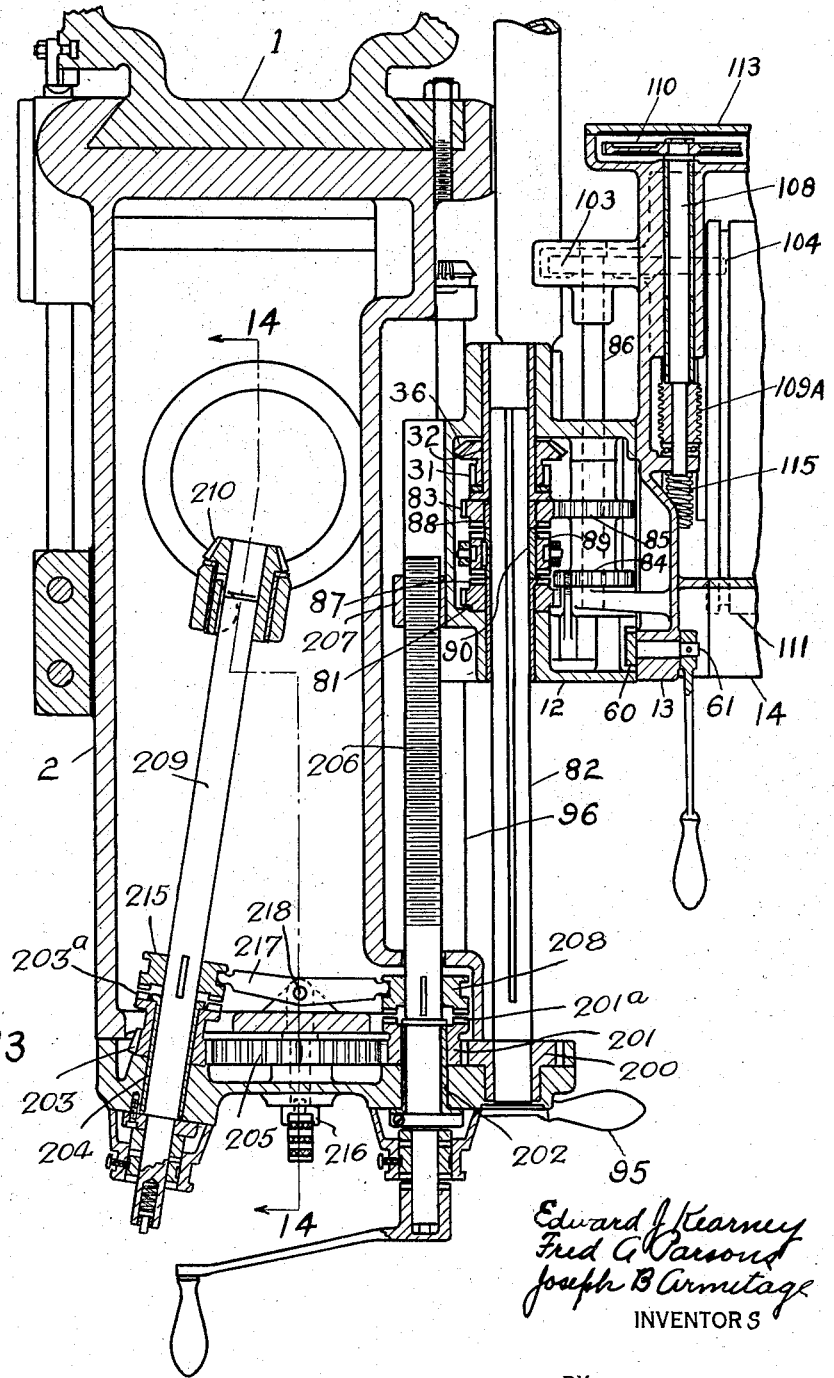
Figure 13 is an enlarged horizontal section through the knee and various associated mechanism along the line 13—13 of Figure 1.

A general summary of the action of the control mechanism is as follows:

The movements of the various supports may be hand actuated when the transmission mechanism is inoperative, the table being moved by applying a crank to the one or the other end of the table screw 51; the saddle by applying a crank to the end of the cross screw 206 as shown in Figure 13; and the knee may be raised and lowered by applying a crank to the end of the shaft 209 shown in Figure 13.

The various movements of the supports may be hand controlled when power actuated. The lever 55, when moved, changes the rate of all actuated supports from feed to power rapid traverse and vice-versa; the lever 67 reverses or stops the table travel, and the lever 95 reverses or stops either the cross movement of the saddle or the vertical movement of the knee, the two latter movements being selective according to the position of engagement of the clutches 208 and 215, as shown in Figure 13.

Any of the movements of any support may be interrupted from the movement of the respective supports by the means of adjustable dogs, at any of the positions intermediate the full travel of the support, or by the means of positive or fixed dogs at the extreme limits of support movement, as described above.

Any of the movements of any support may be interrupted or re-engaged in either direction and at any time and the rate of support actuation may be changed from feed to rapid traverse or vice-versa at any time by the means of adjustable dogs on the carrier.

Since the rate of carrier movement may be changed, the carrier may be given a rate of rotation which will cause it to complete one revolution, or one cycle of its movement in the time or a trifle more than the time required for one or more of the supports to move through their individual or combined cycles of movement, and therefore the carrier may be used to control all the movements of a plurality of members.

It will be noted that for automatic control the reverse clutches may be tripped into a neutral position either from the movement of the support controlled by the respective clutches, or from the movement of the carrier. It is desirable that when support movement is to be interrupted, this should be done by the movement of the support, and when the support is to be started again this should be done by the movement of the carrier. By so doing, it will be evident that at least once in every complete cycle, or as much more often as may be necessary, the dogs on the carrier will be brought to a position exactly corresponding to a given position of the movement of each of the members controlled thereby. Since the carrier does not move in unison with any given support and is at times completely disconnected from any given support, this is an important feature of the automatic control device.

The carrier and the various supports, each having completed their respective cycles of movement, and all the supports having been returned to their starting point and stopped there, the carrier movement may also be interrupted, in which case all the supports will remain stationary until such time as carrier movement is established again by the hand lever 154, which may be immediately or at any future time. Whenever the carrier is caused to start its new cycle, the various members will also repeat their cycles. Automatic action may thus be continuous or may be automatically stopped once per cycle.

Having now fully revealed our invention, we claim:

1. In a milling machine the combination of a work support, a rotatable tool spindle adjacent said support, a support for said spindle, said supports being relatively movable in a plurality of directions, a plurality of driving connections respectively for said different directions of support movement and each including means shiftable for altering the effect of its driving connection, a carrier movable independently of said support movement, a plurality of dogs on said carrier, a plurality of trip devices respectively movable into the path of movement of the respective dogs and respectively having motion transmitting connection with different of said shiftable means, and a power train connected to drive said carrier exclusive of said shiftable means.

2. In a milling machine the combination of a work support, a rotatable tool spindle adjacent said support, a support for said spindle, said supports being relatively movable in a plurality of directions, a plurality of driving connections respectively for said different directions of support movement and each including means shiftable for altering the effect of its driving connection, control mechanism including a carrier rotatably mounted, a power train connectible for non-reversibly actuating said carrier in rotary cycles independently of support movement, a plurality of dogs on said carrier, and motion transmitting connections from said shiftable means of each of said driving connections including a portion positioned to be contacted by one of said carrier dogs during a cycle of movement of said carrier, whereby said shiftable means in each of said driving connections may be moved at intervals determined by the cycle of carrier movement.

3. In a milling machine organization the combination of a work support, a rotatable tool spindle adjacent said support, a support for said spindle, said supports being relatively movable in a plurality of different directions, a power source, a plurality of shiftable clutch elements, transmission mechanism connecting said power source through the respective clutch elements for said different directions of support movement, a carrier mounted for cyclic clutch shifting movement independent of support movement and provided with dogs, motion transmitting connections from the respective clutch elements and each having a portion movable into the path of movement of a carrier dog, and a power train connected to drive said carrier and to be driven from said transmission mechanism at a point unaffected by the movement of either of said clutch elements.

4. In a milling machine the combination of a work support, a rotatable tool spindle adjacent said support, a support for said spindle, said supports being relatively movable in a plurality of different directions, a plurality of driving connections respectively for said different directions of support movement and each including an element shiftable for controlling the driving connection, control means including a plurality of dogs respectively movable in accordance with different of said directions of support movement, trip elements respectively movable into the path of movement of the respective dogs and respectively connected for movement with the different shiftable elements of the different driving connections, other control means including a power driven carrier, dogs on said carrier, and trip elements respectively movable into the path of movement of the respective carrier dogs and respectively connected for the movement of the respective shiftable elements, whereby each of said shiftable elements may be shifted in accordance with support movement in one of said directions or from the movement of said carrier.

5. The combination in a milling machine of a work support, a rotatable tool spindle adjacent said support, a support for said spindle, said supports being relatively movable in a plurality of different directions, a plurality of power driven transmission trains respectively for the actuation of said supports in said different directions and each including a shiftable motion interrupting element, control means for shifting the shiftable element in each of said trains including for each element a first control dog movable in unison with the movement to be controlled thereby, and a second control dog having movement independent of support movement, said second dogs being movable in unison, and a power train connected to actuate said second control dogs.

6. In a milling machine the combination of a work support, a rotatable tool spindle adjacent said support, a spindle support, said supports being relatively movable in a plurality of different directions, transmission mechanism for said movement including a plurality of elements respectively shiftable to interrupt and again shiftable to re-establish movement in different of said directions; and a plurality of control means respectively for different of said shiftable elements and each including a first trip device connected to shift one of said shiftable elements, a first trip dog adapted to contact and move said device during movement of the support in one of said directions whereby to interrupt support movement in the direction last mentioned, a power driven carrier, a second trip device adjacent said carrier and connected to shift the last named shiftable element, and a second trip dog on said carrier arranged to contact and move said second trip device whereby to re-establish movement in said last mentioned direction.

7. In a milling machine, the combination of a work support, a rotatable tool spindle adjacent said support, a spindle support, said supports being relatively movable in a plurality of different paths, a power source, transmission mechanism for actuating said supports from said source in each of said paths, said mechanism including a plurality of shiftable motion reversers respectively controlling the direction of support movement in the different paths, a control member power driven independently of support movement, a plurality of dogs on said member, and a plurality of trip members respectively connected for shifting different of said reversers and each movable into the path of movement of one of said dogs for operation from the power movement of said control member.

8. In a milling machine, the combination of a work support, a rotatable tool spindle adjacent said support, a spindle support, said supports being relatively movable in a plurality of different directions, a power source, transmission mechanism for actuating said supports from said source in each of said directions at a constant rapid traverse rate or at a pre-determined feed rate and including means shiftable for the choice of said rates, a control member movable independently of said support movement, a dog on said member, a trip device having a portion movable into the path of movement of said dog for operation from movement of said control member, and a motion transmitting connection from said trip device to said shiftable means.

9. In a milling machine the combination of a work support, a rotatable tool spindle, a spindle support, said supports being relatively movable in a plurality of different paths, a feed rate transmission, a rapid traverse rate transmission, a plurality of power trains each including a shiftable motion reverser and respectively connected for support movement in different of said paths; clutch means shiftable for alternatively connecting the one or the other of said transmissions to actuate said supports in the one or the other of said paths, a carrier alternatively driven from the one or the other of said transmission in accordance with the position of said shiftable means, dogs on said carrier including a plurality of dogs respectively for different of said motion reversers and a dog for said shiftable means, and a plurality of trip devices respectively having a portion movable into the path of movement of different of said dogs and respectively having motion transmitting connections with different of said motion reversers and with said shiftable means whereby movement of said carrier may control both the rate and direction of movement in each of said paths.

10. In a transmission and control mechanism for milling machines the combination of a plurality of supports including a work support and a tool support, certain of said supports being respectively reciprocable for effecting different paths of relative movement between a work piece and a tool operative thereon and for effecting different directions of movement in each of said paths, transmission mechanism including elements shiftable for support movement at a constant rapid traverse rate or alternatively at a predetermined feed rate and for selectively determining in which of said paths said movement shall take place and in which direction in the selected path, and means for controlling said movements including a carrier independently power driven and connectible for shifting the shiftable elements of said transmission mechanism.

11. In a milling machine organization the combination of a plurality of supports including a work support and a tool support, certain of said supports being respectively movable for effecting different paths of relative movement between a work piece and a tool operative thereon, transmission trains for said movable supports including a plurality of motion reversers respectively shiftable for controlling the direction of support movement in different of said paths, each of said reversers being shiftable into opposite positions effecting opposite movement of the support controlled thereby and into another position where the support will not be actuated, a plurality of dogs respectively movable with different of said movable supports, a plurality of trip members respectively movable into the path of movement of different of said dogs and respectively having motion transmitting connections with different of said reversers, said dogs and trip elements being operative to shift either of said reversers from either support actuating position thereof to said position where the support controlled thereby is not actuated, other transmission mechanism including means shiftable for actuating either of said supports either at a constant rapid traverse rate or at a predetermined feed rate, a power driven carrier, a plurality of dogs on said carrier, and a plurality of trip devices respectively movable into the path of movement of the different carrier dogs and respectively having motion transmitting connections to different of said reversers and to said shiftable means, whereby said carrier dogs may move each of said reversers to re-establish the movement of either support and may move said shiftable means to change the rate of support movement.

12. In a milling machine the combination of a plurality of supports including a work support and a tool support, certain of said supports being respectively movable for effecting different paths of relative movement between a work piece and a tool operative thereon, driving connections for said movable supports including clutch elements shiftable to actuate either movable support in either direction and at a constant quick traverse rate or a predetermined feed rate, manual control means for said driving connections including a plurality of hand levers respectively operably connected for shifting different of said clutch elements, and other control means including a power driven carrier, a dog on each of said supports and a plurality of dogs on said carrier, a plurality of trip elements respectively individual to different of said dogs and including for each of said dogs a trip element movable into the path of movement thereof, and motion transmitting connections from some of said clutch elements to a plurality of said trip elements, whereby the last mentioned clutch elements may be shifted either manually or from the motion of one of said supports or from the motion of said carrier.

13. In a milling machine the combination of a plurality of supports including a work support and a tool support, certain of said supports being respectively movable for effecting different directions of relative movement between a work piece and a tool operative thereon, a non-reversibly rotatable carrier; and power transmission and control mechanism for said movable supports and carrier including a plurality of means respectively shiftable to control movement of different of said movable supports, other means shiftable to interrupt the motion of said carrier, a plurality of dogs on said carrier, and a plurality of trip elements respectively movable into the path of movement of different of said dogs and respectively having motion transmitting connections with different of said shiftable means, whereby each of said shiftable means may be shifted by motion derived from said carrier.

14. In a milling machine, the combination of a plurality of supports including a work support and a tool support, certain of said supports being respectively movable for effecting different directions of relative movement between a work piece and a tool operative thereon, transmission and control mechanism for said movable supports including a plurality of shiftable elements respectively controlling movement of different supports, means for shifting said shiftable elements including a non-reversibly driven rotary carrier, a power train connectible with said carrier including a member shiftable for connecting or disconnecting said train, and means for shifting said shiftable member including a dog on said carrier, a trip device movable into the path of movement of said dog and having a motion transmitting connection with said trip device whereby said dog may disconnect said train by motion derived from the movement of said carrier, and a hand lever connected for the manual shifting of said member whereby to subsequently re-establish the driving connection of said train.

15. In a milling machine the combination of a work support, a rotatable tool spindle adjacent said support, a spindle support, a plurality of power trains each connected with one of said supports and respectively for the movement thereof in different paths, a plurality of shiftable clutch elements respectively in different of said trains; and control means including a power driven carrier, and a plurality of dogs on said carrier respectively having potential motion transmitting connection with different of said clutch elements; said dogs being respectively positioned on said carrier to travel separated paths individual to the respective clutch elements.

16. In a milling machine the combination of a plurality of supports including a work support and a tool support, certain of said supports being respectively movable for effecting different directions of relative movement between a work piece and a tool operative thereon, power transmission mechanism for actuating said supports at a constant rapid traverse rate or at a predetermined feed rate and including clutch means shiftable for alternating said rates and including a plurality of power trains respectively connectible from said clutch means to different of said movable supports through individual motion reversers, a power driven carrier, a plurality of dogs on said carrier, a trip device adjacent said carrier and movable in the one direction into the path of movement of one of said dogs and in the other direction into the path of movement of another of said dogs, and a motion transmitting connection from said trip device to said clutch means, whereby said clutch means may first be shifted by the one dog to cause said supports to be actuated at one of said rates, and may then be shifted by the other dog and in the other direction to change the rate of support actuation.

17. In a milling machine the combination of a plurality of supports including a work support and a tool support, certain of said supports being respectively movable for effecting different directions of relative movement between a work piece and a tool operative thereon, and a power transmission mechanism for actuating said movable supports alternatively at a constant rapid traverse rate or at a predetermined feed rate; and control means including a rotary carrier having non-reversible driving connections, a plurality of dogs on said carrier, a trip device oppositely movable into the path of movement of the one or of the other of said dogs, and motion transmitting connections from said trip device to said clutch means whereby the contacting of said trip means by the respective dogs may shift said clutch means in opposite directions to alternate the rates of support actuation.

18. In a milling machine the combination of a plurality of supports including a work support and a tool support, certain of said supports being respectively reciprocable for effecting different paths of relative movement between a work piece and a tool operative thereon, transmission mechanism for said movable supports including a first clutch means shiftable for establishing support actuation at either a quick traverse rate or at a predetermined feed rate and a plurality of other clutch means respectively shiftable for determining the direction of support movement in different of said paths; and control means including a movable carrier, a plurality of dogs thereon, and a plurality of trip means respectively movable into the path of movement of different of said dogs and respectively having motion transmitting connection with different of said clutch means, whereby each of said movable supports may be controlled both for rate and for direction of movement by the movement of said carrier.

19. In a milling machine the combination of a plurality of supports including a work support and a tool support, certain of said supports being respectively reciprocably movable for effecting different paths of relative movement between a work piece and a tool operative thereon, transmission mechanism for movement of said movable supports in either direction and at either a rapid traverse or a feed rate and including a plurality of reversers respectively shiftable to change the direction of movement of the different supports and means shiftable to change from the one to the other of said rates; and control means for said transmission mechanism providing shifting means including different portions respectively movable in unison with the respective supports and another portion movable independently of support movement, motion transmitting connections including for each of said reversers a connection from one of the first named and from the last named portions, and a motion transmitting connection from said last named portion to said shiftable means.

20. In a transmission and control mechanism for milling machines the combination of a plurality of supports including a work support and a tool support, certain of said supports being respectively reciprocably movable for effecting different paths of relative movement between a work piece and a tool operative thereon, transmission mechanism for said movable supports including a plurality of reversers respectively shiftable to change the direction of actuation of different of said movable supports and including means shiftable to change the rate of support actuation, a carrier rotatably mounted and non-reversibly power driven, a plurality of adjustable dogs respectively mounted on different of the movable supports, other dogs adjustably mounted on said carrier, a plurality of motion transmitting connections each having different portions respectively positioned for contact by one of the first named and by one of the last named dogs, said connections being respectively connected with different of said reversers, and another motion transmitting connection having a portion positioned for contact by some of said other dogs and connected with said shiftable rate change means.

21. In a milling machine the combination of a stationary support, a support slidably carried thereby, a reciprocable support carried by said slidable support, a drive pulley rotatably supported from the stationary support, transmission mechanism connecting said pulley with said reciprocable support for movement thereof in a plurality of paths and including a plurality of shiftable control elements respectively for different of said paths and a shaft journaled in said slidable support and adapted to maintain a driving connection despite the relative movement of said supports, a control device for the movement of said plurality of control elements and including a rotatable carrier, and a power train connected with said carrier and to derive power from said shaft.

22. In a milling machine having three supports, one of which is stationary and the other two each movable relatively thereto, the combination of a drive pulley rotatably supported from said stationary support, a pair of rotatable elements each journaled in one of said movable supports, a train connecting said pulley and one of said elements and including a feed rate change device, a train connecting said pulley to drive the other of said elements at a constant rate, said trains each including elements adapted to maintain their driving connection despite the movement of said supports, transmission mechanism for movement of said movable supports and including means shiftable for alternative driving connection from the one or the other of said elements, a control device for the shifting of said clutch means including a carrier having movement independent of support movement, and a power train connecting said carrier to be driven through said shiftable means.

23. In a milling machine organization, the combination of a tool support and a work support, one of said supports being stationary and the other being relatively movable, a slidable member interposed between said supports, a drive member supported from the stationary support, a plurality of clutch controlled transmission trains respectively connected with the movable support and with said slidable member, a rotatable transmission element carried by said slidable member and driven from said drive member, control means for the clutches of said trains including a carrier rotatably supported from said slidable member, and a power train connected with said carrier, each of said trains being power operable from said transmission element.

24. In a milling machine, the combination of a plurality of supports including a work support and a tool support, one of said supports being stationary and another being movable, transmission mechanism connected for the movement of the movable support including a shiftable clutch, and control means for the shifting of said clutch including a rotatably supported carrier mounted for bodily movement with said movable support, said carrier being power operable independently of the movement of said support.

25. In a milling machine the combination of a plurality of supports including a work support and a tool support, certain of said supports being respectively movable for effecting different paths of relative movement between a work piece and a tool operative thereon, transmission and control mechanism for said movable supports including a plurality of devices respectively shiftable to alter the movement of the different supports, a carrier movable independently of support movement, a power train for driving said carrier exclusive of said shiftable devices, a plurality of adjustable dogs on said carrier and movable therewith in a corresponding plurality of different paths, a plurality of trip devices respectively movable into the path of movement of the different dogs, and motion transmitting connections from the respective trip devices to the different shiftable devices.

26. In a milling machine the combination of a plurality of supports including a work support and a tool support, certain of said supports being respectively movable for effecting different paths of relative movement between a work piece and a tool operative thereon, transmission mechanism including a plurality of clutch controlled support trains respectively connectible with different of said movable supports and each having a feed clutch element and a rapid traverse clutch element interconnected by gearing; a feed train, a rapid traverse train, and clutch means alternatively shiftable for connecting said feed train with each of said feed clutch elements or for connecting said rapid traverse train with each of said rapid traverse elements; and control means for said transmission mechanism including a carrier power driven from one of said support trains, and trip means operable from movement of said carrier for shifting of said clutch means, said gearing being of different ratio in the different support trains.

27. In a milling machine the combination of a work support, a rotatable tool spindle adjacent said support, a spindle support, said supports being relatively movable in a plurality of transverse paths, transmission trains for said support movement including means shiftable for said support movement in either direction and at either a quick traverse rate or at a feeding rate in either of said paths; and control means including a carrier non-reversibly power driven in rotary cycles, and means operative from the movement of said carrier during each cycle thereof to shift a plurality of said shiftable devices respectively altering support movement in the different paths.

28. In a milling machine, the combination of a movable work support, a feed transmission, a rapid traverse transmission, trains connected with said support for the movement thereof in a plurality of transverse paths, each of said trains including a shiftable reverser element and elements shiftable for connecting with each of said transmissions; and control means including a carrier non-reversibly power driven in rotary cycles and operable for the shifting of each of said elements.

29. In a milling machine, the combination of a work support, a rotatable tool spindle adjacent said support, a support for said spindle, said supports being relatively movable in a plurality of transverse paths, transmission mechanism for said support movement including a plurality of reversers respectively individual to said different paths and each shiftable in opposite directions to effect opposite movement and to a central position effective to break the driving connection, and also including means alternatively shiftable to establish a feed rate or a relatively fast rate of support movement, whereby support movement may take place from a starting point and return to said starting point after a variety of movements in different directions and of different duration; and control means for shifting said reversers and shiftable means including a power driven carrier movable in predetermined cycles, and means including rate change elements in the power train of said carrier whereby the duration of one carrier cycle may be altered to substantially correspond to the total time required for a variety of support movements from and in returning to said starting point.

30. In a milling machine, the combination of a movable support, a feed transmission, a rapid traverse transmission, a plurality of trains respectively connected with said support for the movement thereof in different mutually transverse paths, a plurality of reversers respectively associated with different of said trains and each shiftable in opposite directions to effect opposite movement of the support and shiftable to a central position to break the driving connection of the train, means shiftable to alternatively engage each of said trains to be driven from the one or the other of said transmissions, whereby the support may be actuated in either direction and at a plurality of rates in either path, and control mechanism including a plurality of hand levers respectively connected with different of said reversers, another hand lever connected with said shiftable means, a plurality of dogs respectively movable with said support in different of said paths and respectively operable during support movement to shift different of said reversers, a rotatable non-reversible power driven carrier, a plurality of dogs movable with said carrier and respectively operable during carrier rotation to shift different of said reversers, and another dog movable with said carrier and operable during carrier rotation to shift said clutch means.

31. In a milling machine having a support movable in a plurality of transverse paths, the combination of a constant speed transmission, a plurality of trains respectively connected with said support for the movement thereof in the one or the other of said paths, means shiftable to simultaneously connect both said trains with said transmission, gearing operable to effect support movement from said transmission in one of said paths at a relatively lesser speed than in the other path, and control means for the shifting of said shiftable means including a cyclic carrier connected for power movement from the support train operating at said lesser speed.

32. In a milling machine having a support movable in a plurality of transverse paths, the combination of transmission mechanism for movement of said support including a reverser, a plurality of trains respectively connected with said support for the actuation thereof in different of said transverse paths and each connected for actuation through said reverser, a plurality of elements respectively in different of said trains and each shiftable to interrupt the movement of the support, and control means including a power actuated cyclic carrier, a plurality of dogs each movable with said carrier and each operable to shift said reverser at intervals determined by carrier movement; whereby movement of said support may be selectively controlled in the one or the other of said paths from the movement of said carrier.

33. In a milling machine having a movable support, the combination of a plurality of power trains respectively connected with said support for the movement thereof in different mutually transverse paths, a plurality of reversers respectively effective on different of said trains, and automatic control means including a power actuated cyclic carrier, and a plurality of dogs each movable with said carrier and respectively operable to shift different of said reversers at intervals determined by the movement of said carrier, whereby the direction of movement of said support may be independently controlled in the one or the other of said paths.

34. In a milling machine having a movable support, the combination of transmission mechanism for support movement including a power source, a plurality of power trains each connected with said power source and each including a shiftable reverser, another power train connected with one of the first named trains to be driven therefrom through its reverser; said trains being each connectible with said support and respectively for the actuation thereof in different paths each transverse to one another; each of said connected trains including means shiftable to alternatively interrupt or to establish support movement in the path individual to the one or the other of the connected trains; and control means for said transmission including a power actuated cyclic carrier having a plurality of dogs each operable at intervals determined by carrier movement and respectively operable to shift different of said reversers; whereby the movement of said support may be independently controlled in a first path by the movement of one of said reversers from the movement of said carrier, and movement of the other reverser from said carrier may be alternatively operable to control support movement in a second or in a third path.

35. In a milling machine having a movable support, the combination of a power source, a plurality of transmission each connected with said source and respectively operable at different speed, a plurality of power trains each connectible with said support and respectively for the movement thereof in different paths, each of said trains including a plurality of clutch elements respectively shiftable to engage different of said transmissions, control means including a cyclic carrier having a dog, and motion transmitting mechanism connecting said clutch elements for movement to simultaneously engage a clutch element of each train with one of said transmissions or alternatively simultaneously connect the other clutch element of each train with the other of said transmissions, said mechanism having a portion movable into the path of movement of said dog.

36. In a milling machine having a support movable in a plurality of different paths and having a plurality of transmissions respectively connectible with the support for the movement thereof in different of said paths, said transmissions each having a plurality of clutch elements interconnected by gearing, said gearing being of different ratio in the different transmissions; the combination of a feed train including a plurality of clutch members respectively connectible with one of said clutch elements of the different transmissions, a rapid traverse train including a plurality of clutch members respectively connectible with the other clutch element of the different transmissions, means shiftable to simultaneously connect said members in said feed train with the elements of each transmission and alternatively shiftable to connect said members in said rapid traverse transmission with the elements of each transmission, whereby either of said transmissions may be simultaneously actuated from either of said trains; and control means for said shiftable means including a power actuated dog, a trip element movable into the path of movement of said dog and a motion transmitting connection from said trip element to said shiftable means.

37. In a milling machine the combination of a column, a rotatable tool spindle, a knee supported from said column for bodily vertical movement, a work table supported from said knee for bodily movement therewith and for horizontal reciprocatory movement in a direction transverse to the axis of said spindle, transmission mechanism for said movements including a feed rate changer, quick traverse rate means driven to exclude said rate changer, a plurality of trains respectively for said vertical knee movement and for said horizontal table movement, means shiftable for connecting a portion of each of said trains to be simultaneously driven from said feed rate changer and alternatively shiftable to connect said portions to be simultaneously driven from said quick traverse means, said transmission mechanism including means operative to effect a substantially faster rate of quick traverse movement in said horizontal movement than in said vertical movement, and a plurality of motion interrupters respectively for interruption of different of said trains; and control mechanism for said transmission including a plurality of trip devices respectively operable in accordance with said vertical movement and with said horizontal movement for the operation of different of said motion interrupters and another trip device operable in accordance with one of said movements and having motion transmitting connection with said shiftable means.

38. In a milling machine the combination of a column, a rotatable tool spindle supported from said column, a spindle transmission including a power source, a motion interrupter, a spindle rate changer and said spindle in the order recited, a knee supported from said column for bodily vertical movement, a work table supported on said knee for bodily movement therewith and for horizontal reciprocatory movement in a direction transverse to the axis of said spindle, transmission mechanism for said movements including a feed rate changer driven from said spindle transmission exclusive of said spindle rate changer, quick traverse rate means driven from said spindle train exclusive both of said spindle rate changer and of said motion interrupter, a plurality of trains respectively for said vertical knee movement and for said horizontal table movement and each including a driving portion, a driven portion and an element shiftable to alter movement of said driven portion, and means shiftable to connect said driving portions to be simultaneously driven from said feed rate changer or alternatively shiftable to connect said driving portions to be simultaneously driven from said quick traverse means, said transmission mechanism including rate reducing mechanism effective on only said vertical movement; and control means for said transmission mechanism including automatic trip means having a plurality of portions respectively operable in accordance with said vertical movement and with said horizontal movement for shifting different of said shiftable elements and having another portion operable in accordance with one of said movements to shift said shiftable means.

39. In a milling machine the combination of a column, a rotatable tool spindle supported from said column, a knee supported from said column for bodily vertical movement, a work table supported on said knee for bodily movement therewith and for horizontal movement in a direction transverse to the axis of said spindle, transmission mechanism for said movements including a feed rate changer, quick traverse rate means, a plurality of trains respectively for said vertical knee movement and for said horizontal table movement and each including a driving portion, a driven portion and an element shiftable to alter movement of said driven portion, and means shiftable to connect said driving portions to be simultaneously driven from said feed rate changer or alternatively shiftable to connect said driving portions to be simultaneously driven from said quick traverse means, said transmission mechanism including means operable to effect a quick traverse rate of said bodily vertical movement at a rate substantially less than the quick traverse rate of said table horizontal movement, and control means for said transmission including automatic trip means having a plurality of portions respectively operable in accordance with said vertical movement and with said horizontal movement for shifting the shiftable element of the corresponding path and having another portion operable in accordance with said horizontal movement to shift said shiftable means.

40. In a milling machine the combination of a column, a rotatable tool spindle supported from said column, a knee supported from said column for bodily vertical movement, a work table supported on said knee for bodily movement therewith and for horizontal movement in a direction transverse to the axis of said spindle, transmission mechanism for said movements including a feed rate changer, quick traverse rate means driven to exclude said rate changer, a plurality of trains respectively for said vertical knee movement and for said horizontal table movement, means shiftable for connecting a portion of each of said trains to be simultaneously driven from said feed rate changer and alternatively shiftable to connect said portions to be simultaneously driven from said quick traverse means, and a plurality of reversers each having a motion interrupting position and respectively associated with different of said trains, said transmission including means operative to effect a quick traverse rate of said bodily vertical movement at a rate substantially less than the quick traverse rate of said table horizontal movement, and control mechanism for said transmission including automatic trip means having a plurality of portions each dog operable in accordance with said horizontal movement and respectively operable for shifting the reverser of said table horizontal movement train and for shifting said shiftable means and other control means including a plurality of hand levers respectively having motion transmitting connection with the different reversers.

41. In a milling machine the combination of a column, a rotatable tool spindle supported from said column, a knee supported from said column for bodily vertical movement, a work table supported on said knee for bodily movement therewith and for horizontal movement in a direction transverse to the axis of said spindle, transmission mechanism for said movements including a feed rate changer, quick traverse rate means, a plurality of trains respectively for said vertical knee movement and for said horizontal table movement and each including a driving portion and a motion reverser having a motion interrupting position, and means shiftable to connect said driving portions to be simultaneously driven from said feed rate changer or alternatively shiftable to connect said driving portions to be simultaneously driven from said quick traverse means, said transmission mechanism including means operable to effect said bodily vertical movement at a quick traverse rate substantially less than the quick traverse rate of said horizontal movement; and control mechanism for said transmission including automatic trip means having a plurality of portions respectively operable in accordance with movement in different of said paths for shifting the reverser of the corresponding path to said motion interrupting position and having another portion operable to shift said shiftable means.

42. The combination with a knee and column type milling machine having means for imparting in and out and transverse shifting movements to the table portion thereof, a direction determining means therefor, of a bracket for attachment to the machine, and trip controlled means carried by the bracket adapted to be interconnected with said direction determining means for automatically effecting the several movements of the table.

EDWARD J. KEARNEY.
FRED A. PARSONS.
JOSEPH B. ARMITAGE.